US007421319B2

(12) United States Patent
Stefani

(10) Patent No.: US 7,421,319 B2
(45) **Date of Patent: *Sep. 2, 2008**

(54) SYSTEMS AND METHODS FOR PREFLIGHT PLANNING AND INFLIGHT EXECUTION USING PORTABLE ELECTRONIC DATA STORAGE AND DISPLAY DEVICES

(75) Inventor: Rolf Stefani, West River, MD (US)

(73) Assignee: ARINC Inc., Annapolis, MD (US)

( * ) Notice: Subject to any disclaimer, the term of this patent is extended or adjusted under 35 U.S.C. 154(b) by 758 days.

This patent is subject to a terminal disclaimer.

(21) Appl. No.: 10/971,104

(22) Filed: Oct. 25, 2004

(65) Prior Publication Data

US 2008/0140266 A1 Jun. 12, 2008

(51) Int. Cl.
*B64C 23/00* (2006.01)

(52) U.S. Cl. ............................... 701/3; 701/13; 701/14; 701/15; 701/16; 244/75.1

(58) Field of Classification Search ..................... 701/3, 701/4, 13–15, 16; 244/75.1
See application file for complete search history.

(56) References Cited

U.S. PATENT DOCUMENTS

| | | | |
|---|---|---|---|
| 4,642,775 A | 2/1987 | Cline et al. | |
| 4,796,190 A | 1/1989 | Cummings | |
| 4,827,419 A | 5/1989 | Selby, III | |
| 5,758,297 A | 5/1998 | Gaultier | |
| 5,978,715 A | 11/1999 | Briffe et al. | |
| 6,038,498 A | 3/2000 | Briffe et al. | |
| 6,064,922 A | 5/2000 | Lee | |
| 6,401,013 B1 | 6/2002 | McElreath | |
| 6,597,294 B1 | 7/2003 | Ariens | |
| 6,606,544 B2 | 8/2003 | Glenn, III et al. | |
| 6,633,801 B1 | 10/2003 | Durlacher et al. | |
| 2006/0041340 A1 * | 2/2006 | Stefani | 701/4 |

OTHER PUBLICATIONS

U.S. Appl. No. 10/919,318, filed Aug. 17, 2004, Stefani.

* cited by examiner

*Primary Examiner*—Gertrude Arthur Jeanglaud
(74) *Attorney, Agent, or Firm*—Oliff & Berridge, PLC

(57) ABSTRACT

This invention provide systems and methods for cockpit flight crew preflight planning and subsequent, systematic recall and execution of procedures, ground/inflight navigation, and communications using portable electronic data storage and display devices. A capability is provided within a portable electronic data storage and display device to replace and replicate the typical preflight planning methodology of the individual flight crew member to facilitate execution of a procedures, navigation and communications plan from preflight to postflight. A user may create a usable subset of the potentially thousands of available pages of data or data reference pages stored in the portable electronic data storage and display device, organizing the perhaps 100 or less individual pages of data, static or interactive, desired for a specific leg of the flight in order that required information is immediately available in an expected order of need.

26 Claims, 7 Drawing Sheets

SYSTEMS AND METHODS FOR PREFLIGHT PLANNING AND INFLIGHT EXECUTION USING PORTABLE ELECTRONIC DATA STORAGE AND DISPLAY DEVICES

BACKGROUND OF THE INVENTION

1. Field of Invention

This invention is directed to systems and methods for facilitating preflight planning and inflight procedures, navigation and communications execution using portable electronic data storage and display devices.

2. Description of Related Art

Portable electronic data storage and display devices, such as, for example, electronic notebooks and like handheld devices, present a tremendous capacity to provide a user with readily available information that was previously found only in large, cumbersome technical or reference libraries of printed publications. Use of these portable electronic data storage and display devices in many highly technical environments is becoming commonplace. The capabilities of such devices are limited only by their internal data storage capacities, specific functionality of the individual pages (for example, whether an individual page simply portrays static readable data in either textual or graphical form, or the individual page provides some interactive capability to the user), and methodologies or capabilities for manipulating pages of data resident in the device. Many of these portable electronic data storage and display devices in common use today are oriented to specific sets of tasks or specific usable purposes. One such example is the Electronic Flight Bag, or "EFB," which is gaining wide acceptance with individual cockpit flight crew members, particularly in large commercial airline, military transport and general aviation aircraft with multi-place cockpits.

In specifically task-oriented operations, these devices, in addition to their capacity for storage and display of tremendous technical or reference libraries of information, provide a platform to enable other tasks to be automated. In EFBs, for example, checklists are made interactive, and other data form fill type functions, such as performing weight and balance and/or performance calculations, may be enabled.

Conventionally, each member of a commercial airline, military transport or general aviation aircraft cockpit flight crew carries with them, into the cockpit of the aircraft, a large "flight bag," which is a catalog case full of normal procedural and emergency procedures checklists, aircraft operating manuals including tables of operating limitations, domestic and international navigational charts (as appropriate), and/or other pertinent or required inflight information publications and the like. As such, for flight operations in the United States alone, a total page count for all of the required documents could number in the tens of thousands.

In an attempt to manage the subset of this overwhelming library of information which is required for a specific flight in a specific region on a specific day, an individual cockpit flight crew member's routine includes pre-arranging selected portions of this extensive library of all required printed materials in an anticipated order of need for a given leg of flight from a departure airport to a destination airport. The individual cockpit flight crew member typically arranges the data pages as a collection of paper pages ordered in a sequence that reflects the intended flight trajectory for that leg. The data pages are typically stored on a clipboard, or as marked pages in a binder or series of binders. Such organization of needed data is done manually by each individual cockpit flight crew member prior to each leg on each flight. As such, specific references required for preflight, start, taxi, takeoff, departure, inflight/enroute navigation, arrival, approach, landing, taxi, shutdown and postflight are readily available substantially in the order in which it is anticipated that they will be required. Such preflight planning and organization results in an increased measure of safety once airborne by minimizing the time necessary for the individual cockpit flight crew member to access information required for a specific phase flight, and consequently minimizing time spent not concentrating solely on controlling the aircraft.

Special and/or emergency procedures checklists and publications are often segregated and kept in a separate portion of each individual cockpit flight crew member's flight bag. Those publications to which quick access may be required during critical phases of flight are often segregated in this manner in order to minimize the time necessary for the individual cockpit flight crew member to access the required information, thereby coincidentally minimizing the amount of time which the individual cockpit flight crew member's attention is diverted from concentrating principally on controlling the aircraft when such concentration should be most acute in order to meet the special circumstances presented.

Additionally, there are many repetitive tasks which often require the recall, review and verification of individually mandated checklists in order to ensure and record completion of individual steps. Also, individual cockpit flight crew members must routinely fill out and/or accept a number of standard forms for each flight. Each of these repetitive or routine tasks requires significant interaction between individual cockpit flight crew members in order to ensure task completion. Any opportunity to automate such tasks may assist in increasing effectiveness, efficiency, and safety in the operation of the aircraft.

SUMMARY OF THE INVENTION

Against the conventional set of circumstances, the use of microprocessor-based portable electronic data storage and display devices, such as, for example, EFBs, is becoming more popular in commercial airline, large transport, and general aviation aircraft. The introduction of EFBs into the cockpits of commercial airline, multi-place military transport and other aircraft provides an automated and interactive library of publications in electronic format to replace the conventional flight bag full of checklists, charts, publications and the like. As with the previous printed library of publications, each individual cockpit flight crew member carries all of the required reference materials with regard to the operation and navigation of the aircraft; however, now these materials are contained in an electronic notepad or like portable electronic data storage and display device. As with the previous printed library of publications, for flight operations in the United States domestic air space alone, there are in excess of 13,800 separate electronic documents generally displayed in Portable Document Format (PDF). These include such documents as individual airport diagrams, airport runway approach procedures and various other navigation specific pages of data. Enroute charts, for example, are broken down into a page format to be easily accessed and read.

Simply because these documents are now available in electronic format does not relieve the individual cockpit flight crew member of the responsibility of having the necessary data immediately available in order to execute whatever procedures are required in safely operating the aircraft. There are certain procedural modifications made necessary or desirable by the use of portable electronic data storage and display devices in the cockpits of aircraft. Such procedural modifications may be enhanced if, for example, a data reference page search, sort and acquisition capability of the devices is effectively and/or optimally used.

U.S. patent application Ser. No. 10/919,318, by the same inventor and with a common assignee, the disclosure of which is incorporated herein in its entirety by reference, discloses a system and method to modify certain cockpit procedures by allowing an individual cockpit flight crew member not exercising immediate control over an aircraft during a given critical phase of flight to be able to interact with the EFB of another cockpit flight crew member, particularly the EFB of the individual cockpit flight crew member who is in immediate control of the aircraft and therefore must keep his or her hands on the aircraft controls. The capabilities disclosed by the '318 application closely replicate the conventional flight crew interaction and coordination scheme where a co-pilot, for example, produces, selects, and provides to the pilot the required reference publication within the pilot's field of view for the pilot's immediate use. Additionally, a system and method is provided to increase the ability for individual cockpit flight crew members to interact electronically. For example, when an individual cockpit flight crew member displays an interactive checklist, some or all of the other individual cockpit flight crew members may benefit from having the same checklist for that required phase of flight automatically displayed. With such capability, the entire cockpit flight crew can interact in a manner such that individual cockpit flight crew members can execute a certain step of a checklist and then verify completion of that step in the task in a manner that allows the status of the checklist to be consistently updated and supplied to the other individual cockpit flight crew members.

It is desirable to have a specific capability within a portable electronic data storage and display device to replace and replicate the typical preflight planning methodology of the individual flight crew member to facilitate execution of a procedures, navigation and communications plan from preflight to postflight. This may be accomplished by providing a capability for the user to create a usable subset of the thousands of available pages of data or data reference pages stored in the portable electronic data storage and display device. An exemplary objective is to provide in the portable electronic data storage and display device a capability that facilitates cockpit flight crew preflight planning and organizing of the perhaps less than 100 individual pages of data, static or interactive, which may be required for a specific leg of the flight in order that required information is logically ordered and as such immediately available in an expected order of need, while also providing reasonably easy access to myriad special and emergency procedures.

Embodiments of this invention provide systems and methods for cockpit flight crew preflight planning and subsequent, systematic recall and execution of procedures, ground/in-flight navigation, and communications using portable electronic data storage and display devices.

Embodiments of this invention may provide a capability to organize a preprogrammed sequence of data reference pages as a discrete set in an expected order of need for a specific leg of flight, for sequential display on an individual cockpit flight crew member's portable electronic data storage and display device, such as, for example, an EFB. Specifically, an individual cockpit flight crew member may be provided the capability to preprogram an individual EFB to display all information necessary for the safe and efficient conduct of a flight from preflight through postflight including, for example, information regarding a departure airport (including the airport diagram), departure procedures from that airport, enroute flight information, approach procedures at a destination airport, and information regarding the destination airport (including the airport diagram).

Additionally, interspersed between these static "information only" data reference pages, as the cockpit flight crew member may individually desire, may be required checklists such as, for example, preflight, start, ground/taxi/takeoff, departure, enroute, arrival/descent, terminal area, landing, postlanding and shutdown checklists, any or all of which may be displayed in an interactive manner. With such a capability, an individual cockpit flight crew member can select a static page of data to be displayed. Alternatively, an individual cockpit flight crew member can initiate verification of cockpit flight crew member interaction. Such interaction is usable for, for example, executing checklists, filling out forms or the like, by selecting a dynamically interactive data reference page, which not only displays certain required data but also initiates an interactive subroutine in which steps in a checklist, or blanks in a form, may be provided. These blanks can then be completed by the individual cockpit flight crew member, the portable electronic data storage and display device recording that completion, and optionally storing the recorded information to a number of uses.

In various exemplary embodiments of the systems and methods according to this invention, individual cockpit flight crew members can select, and prefile in a folder format, from among the thousands of data reference pages of information available in electronic form in the individual cockpit flight crew members' EFBs, a subset, such as 100 pages or less, that will be required or are desired to be immediately available for that leg of flight. The systems and methods according to this invention may provide the capability for storing individual routes or flight legs as files identified in some reasonable manner, such as, for example, as folders labeled with departure and destination airfield identification designators.

It may also be desirable to connect the portable electronic data storage and display devices of individual cockpit flight crew members via a communications link, e.g., a cockpit-installed private local area network in the cockpit of a multi-place, multi-crew member aircraft, or any other like communication link usable to support data transfer between EFB units. These data transfer capabilities, as disclosed in U.S. patent application Ser. No. 10/919,318, can include, for example, permanently-installed cable connections, temporary cable unit-to-unit connections, wireless data transfer, other data transfer capabilities or any combination of these appropriate to the particular cockpit environment.

In various exemplary embodiments, the systems and methods according to this invention improve safety by minimizing the need for the individual cockpit flight crew member at any given time to be inordinately, or other-than-momentarily, distracted in selecting alternative pages of data in an EFB for display.

Embodiments of this invention may provide systems and methods to guard against defocusing the pilot from the task of operating the aircraft safely by minimizing the necessity for the pilot to divert his or her attention from actual manipulation of the controls of the aircraft in order to find necessary navigational information or interactive normal or emergency procedures checklists keyed to critical phases of flight and other operational situations.

These and other features and advantages of the invention are described in, or apparent from, the following detailed description of the various exemplary embodiments of the systems and methods according to this invention.

BRIEF DESCRIPTION OF THE DRAWINGS

Various exemplary embodiments of the systems and methods according to this invention will be described, in detail, with reference to the following figures, wherein.

DETAILED DESCRIPTION OF PREFERRED EMBODIMENTS

The following description of various exemplary embodiments of systems and methods for enhancing cockpit flight crew preflight planning and inflight execution of a flight plan using portable electronic data storage and display devices will focus on a currently available EFB device. However, it should be appreciated that the principles of this invention, as outlined and/or discussed below, can be equally applied to any hand-held electronic data storage and display device which can be adapted for organizing subsets of required static and dynamically interactive data pages in folders for sequential use as tasks are executed in a reasonably sequential, preplanned manner in a high-activity or highly task-loaded working environment.

The systems and methods according to exemplary embodiments of this invention provide capabilities to preprogram, for later recall in inflight execution, a sequence of data reference pages organized in an expected order of need for a specific leg of flight. Specifically, an individual cockpit flight crew member may be provided the capability to preprogram an individual EFB unit to display all information necessary regarding the departure airport (including the airport diagram), departure procedures from that airport, enroute flight information, approach procedures at the destination airport, and all information regarding the destination airport (including the airport diagram). Additionally, interspersed between the static pages, as the cockpit flight crew member may individually desire, may be required prestart, start, ground/takeoff, departure, in-flight, approach, landing and after landing/shutdown checklists. Each of these checklists may be provided in an interactive manner.

It should be appreciated that, different from simply displaying individual electronic documents, the systems and methods according to exemplary embodiments of this invention provide a capability usable to fit the utilization of electronic documents to the actual workflow patterns of the cockpit flight crew, tailored to the actual or intended route of flight. Relatively easy and nearly immediate access to necessary documents in an individually-tailored order based on the desires of the individual cockpit flight crew member, and/or based on mandated requirements, may provide seamless document management and display functionality enhancing efficiency and effectiveness of the entire cockpit flight crew, and safety of the flight operations in which the crew is involved.

Figure 1:
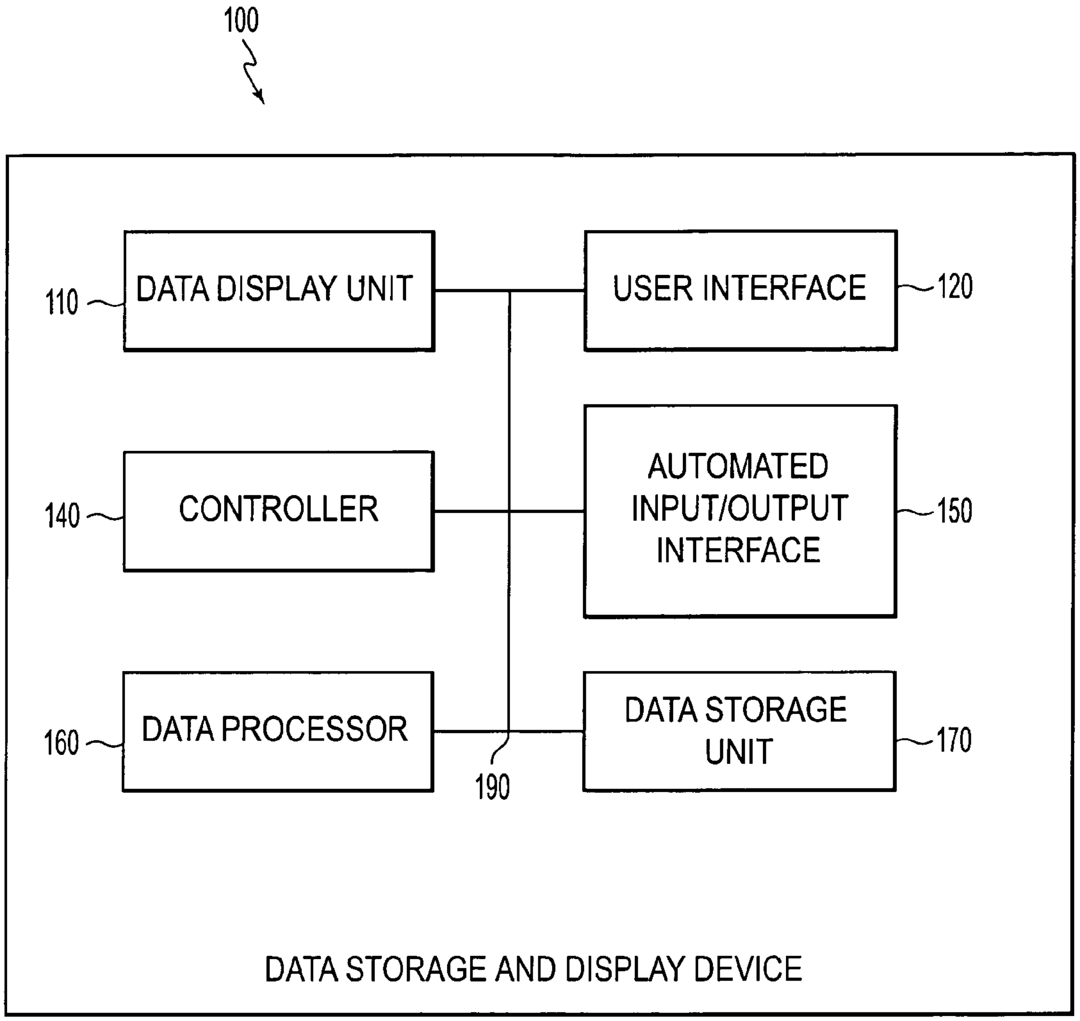
FIG. 1 illustrates a block diagram of an exemplary embodiment of a generic portable electronic data storage and display device, of which an EFB is one specific example, usable with the systems and methods according to this invention.

FIG. 1 illustrates a block diagram of an exemplary embodiment of a generic portable electronic data storage and display device 100, of which an EFB is one specific example, usable with the systems and methods according to this invention. As shown in FIG. 1, a generic portable electronic data storage and display device 100 includes a data display unit 110, a user interface 120, a controller 140, an optional automated input/output interface 150 (provided, for example, to communicate in a network solution involving other portable electronic data storage and display devices and/or a range of peripheral devices), a data processor 160 and at least one data storage unit 170, these elements being interconnected as necessary by a data/control bus 190. The system controller 140, in combination with the data processor 160, provides a capability which allows a user, via manipulation of the user interface 120, to create a discrete file of, for example, 100 or less required or desired data reference pages selected from among the potentially tens of thousands of static and interactive data storage pages which are stored in the data storage unit 170 of the exemplary data storage and display device 100. A specific grouping of pages so selected is identified with a unique identifier and stored discretely for later access by a user when that user later calls that information via input through the user interface 120.

In various exemplary embodiments of the systems and methods according to this invention, the data display unit 110 may include components of the user interface 120. The data display unit, for example, may provide, in certain modes of operation or views, menu buttons with which an individual cockpit flight crew member can manipulate and control the data to be display in the overall data display area of the EFB 200. Such manipulation may include selection of a specific data reference page to be displayed. Alternatively, a capability may be provided wherein the individual cockpit flight crew member can manipulate in an interactive manner a displayed data reference page if that data reference page has an interactive capability associated with it. In various exemplary embodiments, the overall display area of the EFB 200 may become an entirely interactive user interface by displaying, for example, a fully interactive alpha-numeric touch pad.

A capability of a user to discretely select and store a subset of the data reference pages available in a portable electronic data storage and display device that will be required or are desired for a specific sequential task, such as, for example, those data reference pages required or desired in an EFB keyed to a specific leg of flight from a departure airport to a destination airport, is facilitated by configuring a display unit 110 and a user interface 120 to provide a simple and user-friendly methodology for a user to quickly sort through the tens of thousands of data reference pages of required information to build a folder which includes only those data reference pages which are required or desired by the current user in the current sequential task to be available to be displayed in the display unit 110. As will be discussed in an exemplary manner in detail below, with reference to FIGS. 4-7, such capability is provided by the systems and methods according to this invention in a user-friendly, straightforward manner.

In various exemplary embodiments of the systems and methods according to this invention, user performance is enhanced by exploiting the available potential for data page control and manipulation via the user interface 120 of the portable electronic data storage and display device 100.

Details of such an exemplary pre-task planning system and method will be described in detail below with specific reference to an EFB.

Figure 2:
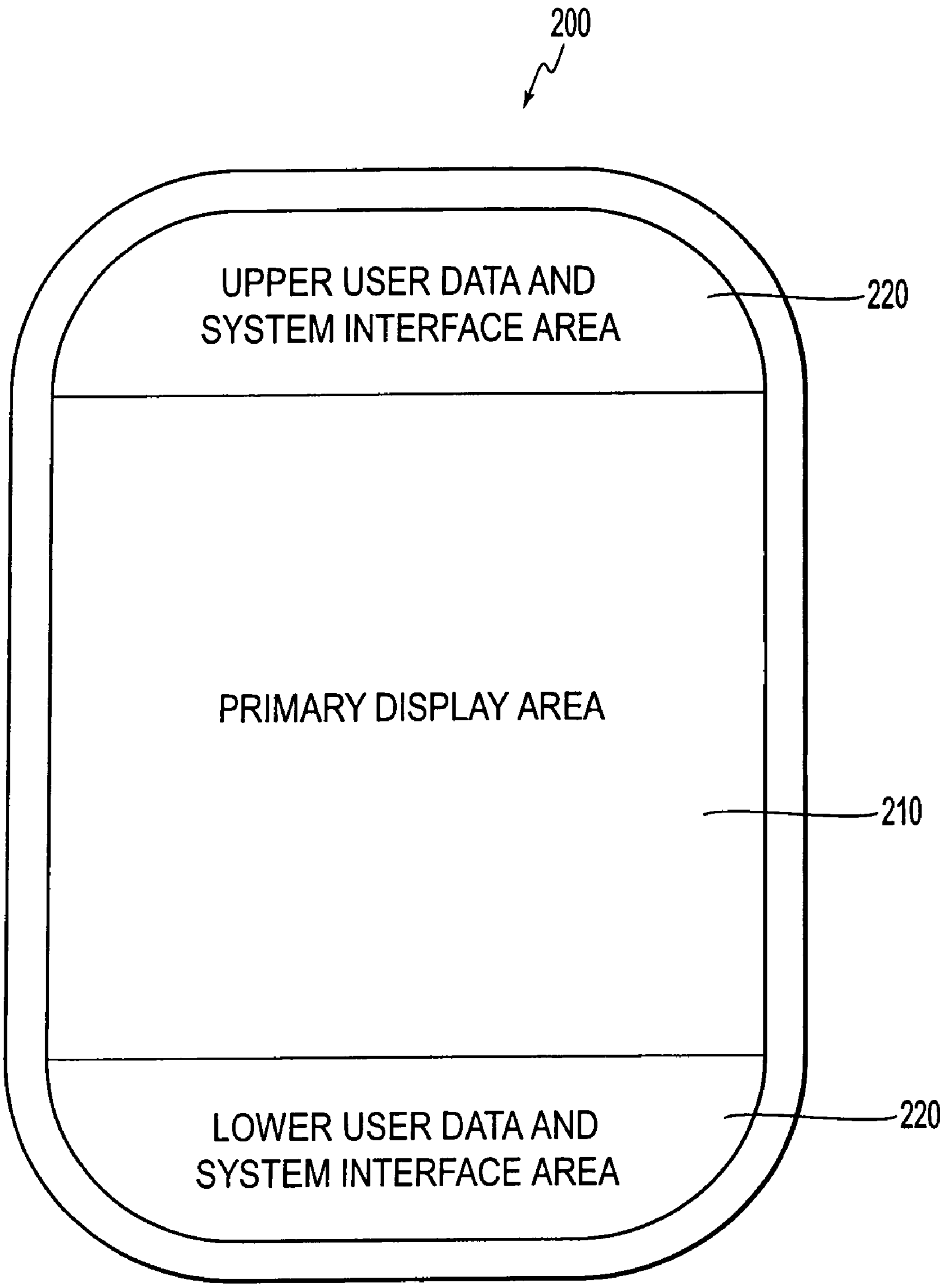
FIG. 2 illustrates an exemplary embodiment of an EFB as an example of a portable electronic data storage and display device usable with the systems and methods according to this invention.

FIG. 2 illustrates an exemplary embodiment of an EFB 200 as an example of a portable electronic data storage and display device usable with the systems and methods according to this invention. As shown in FIG. 2, an exemplary embodiment of an EFB 200 includes a primary data display area 210, upper and lower display areas 220 for user data input and user system interface. The upper and lower display areas 220, located in an exemplary manner in the top and bottom three quarters of an inch of the overall display area, are dedicated to receive user input and present options for a user for manipulating the data to be displayed on the primary display area 210 of the exemplary EFB 200. One or both of these upper and lower display areas 220 are preferably normally hidden allowing the primary display area 210 to extend to the limits of the overall display area of the exemplary EFB 200. When the overall display area of the EFB 200 is touched in either of the upper and lower display areas 220, menu choices may be presented to the user. A first-level set of options for these menu choices may include, for example, a capability to select general operating modes of the exemplary EFB 200.

The primary display area 210, which, as noted above, generally overlaps one or both of the upper and lower display areas 220, can be used to display any one of the potentially tens of thousands of static (e.g., text and still pictures), dynamic (e.g., video and/or audio), and/or interactive (e.g., checklists and/or forms), data reference pages stored in the data storage unit (element 170 shown in FIG. 1) as a reference library in the exemplary EFB 200. Such data reference pages displayed normally in the primary display area 210 include, for example, required checklists, aircraft operating manuals, navigation charts and/or publications, and other like data reference pages of reference material required for operation and navigation of a particular aircraft under normal and emergency conditions. An individual cockpit flight crew member can simply preview and/or review the information presented which will be or is critical to the immediate phase of flight. Alternatively, in the case of checklists, these are often available in an interactive manner such that, as individual steps in the checklist are completed, the individual cockpit flight crew member can "check-off" the step in an interactive manner by manipulating the display of the exemplary EFB 200. For example, the individual cockpit flight crew member will be able to simply point to the individual step in the checklist and a resulting indication for the "check-off" of the step will then be displayed in the primary display area 210, i.e., on the checklist itself, of the exemplary EFB 200.

Figure 3:
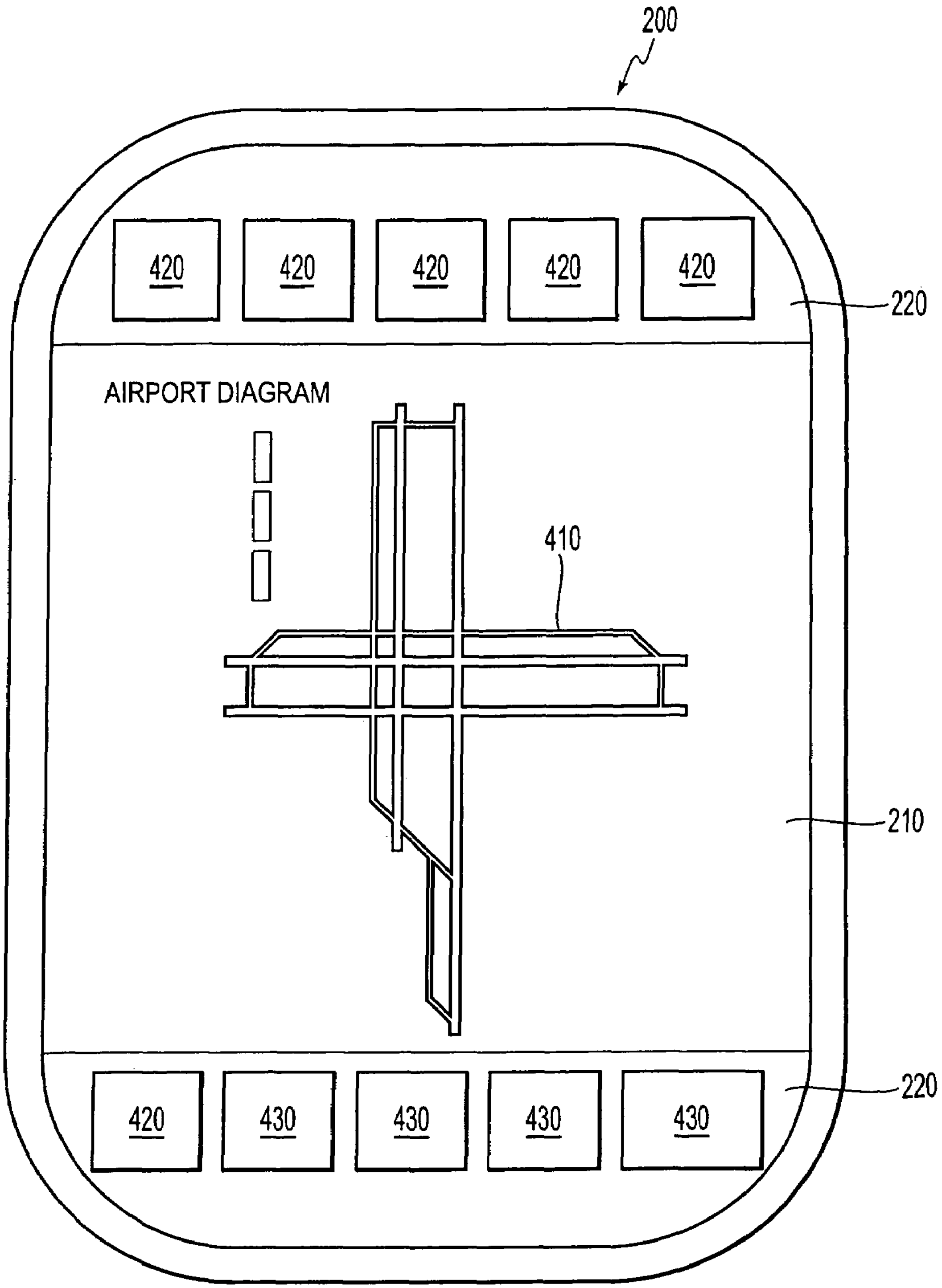
FIG. 3 illustrates a first operating view of the EFB of FIG. 2.

FIG. 3 illustrates a first operating view of the EFB 200 of FIG. 2. As shown in FIG. 3, an exemplary representative airport diagram 410 is shown as typical of the information which could be displayed in the primary data display area 210. Additionally, in this view of the exemplary embodiment of the EFB 200, the user, e.g., the individual cockpit flight crew member, may have touched the EFB 200 overall display screen in the upper and lower display areas 220 in order that preferably hidden menu buttons 420 (in an exemplary manner, five each in the upper and lower display areas 220) may be presented. With these menu buttons 420, random in number and individually labeled as required to support specific tasks, the individual cockpit flight crew member can manipulate and control the data to be displayed in the primary data display area 210 of the EFB 200 in order to display a specific data reference page which that individual cockpit flight crew member desires to view at that time. Additionally or alternatively, the menu buttons 420 may provide a capability wherein the individual cockpit flight crew member can manipulate in an interactive manner the data reference page displayed if that data reference page has an interactive capability associated with it. This latter capability will be discussed in greater detail below with reference to FIG. 4.

In various exemplary embodiments of the systems and methods according to this invention, in at least one of the upper and lower user data and interface areas 220, one or more of the menu buttons 420 displayed will provide the user an ability to select an interactive subroutine which provides the individual cockpit flight crew member with the capability of selecting, ordering, and filing, as a discrete subset of all of the available data reference pages, a selected number of data reference pages as may be required for a specific leg of a flight. By selecting the specifically labeled menu button which is associated with the subroutine, the individual cockpit flight member is afforded the opportunity to build a "trip folder" for that leg of flight. It is the composing, storing and using of such a trip folder which will be discussed in exemplary manner below with reference to FIGS. 5-7.

For ease of explanation, with the exemplary systems and methods according to this invention, a trip folder will represent a named collection of data items such as airport diagrams, departure instructions, approach plates and route maps, or any other required or desired data reference pages, often presented as JPEG pictures and images or HTML documents, that could be required or desired by an individual flight crew member during a given phase of flight. The trip folder creation process allows the individual cockpit flight crew member or other EFB user to easily identify a departure airport and a destination airport, and optionally an alternate airport, and to create a specific collection of document identifiers that will lead to individual data reference pages that can be saved and then referred to at any time in the future.

Figure 4:
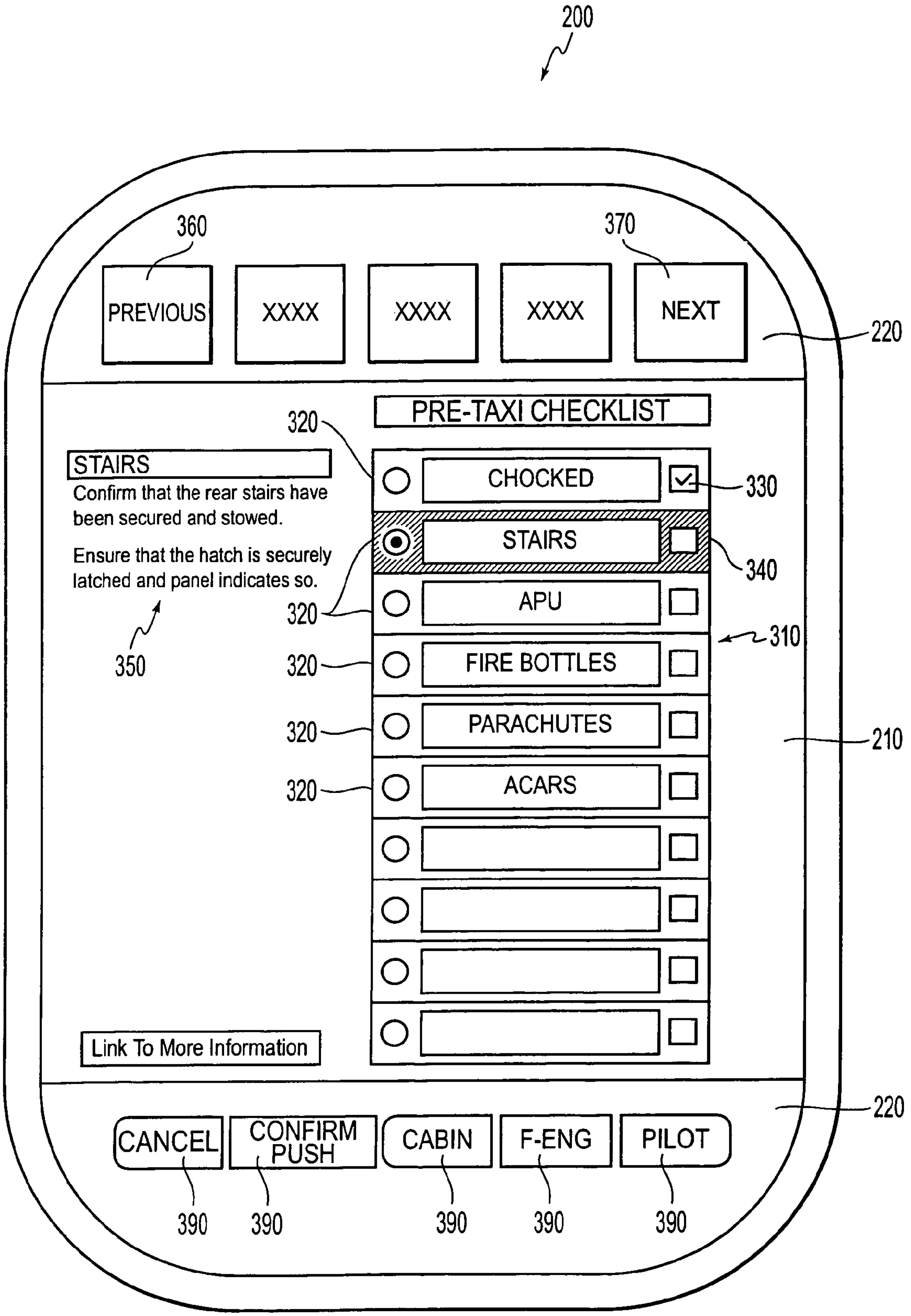
FIG. 4 illustrates a second operating view of the EFB of FIG. 2.

FIG. 4 illustrates a second operating view of the EFB 200 of FIG. 2. As shown in FIG. 4, and as discussed above, it is not only static information or diagrammatic pages that are able to be selected and included for display. Rather, as shown in exemplary manner in FIG. 4, any one or more of the required aircraft operational or emergency checklists can be selected, and, as will be detailed below, designated for inclusion in one or more of the user-created subset of data reference pages stored in discrete folders. Once selected, a checklist 310, provided in exemplary manner, as the pretaxi checklist shown in FIG. 4, allows completion and verification of each of the steps in a specific required or desired checklist to be confirmed. Such a checklist 310 includes a listing 320 of required steps. Completed steps may be indicated by any appropriate indicator, in this case a check mark 330. The next step to be completed 340 may then be highlighted as shown. At the same time, a narrative 350 may be provided in the narrative area of the checklist display 310 in order to explain specifically what should be completed prior to indicating that that particular step is complete. An exemplary "previous" menu button 360 and an exemplary "next" menu button 370 may be provided in order to allow the user to select either the previous or the next data reference page available in the user-created subset of data reference pages. Additionally, other menu buttons 390 may be provided in order to allow the user to otherwise interface with capabilities of the exemplary EFB 200.

It should be appreciated that the exemplary EFB 200 is capable of storing, for later recall, different checklists and/or performance charts pertaining to multiple types and/or models of aircraft. When such different references are stored, the exemplary EFB 200 may be provided with a capability for positive authentication by the individual user of the type and/or model of aircraft within which the exemplary EFB 200 is to be used for a specific leg of flight. Such a feature may provide an extra margin of safety be substantially ensuring that only those aircraft specific references that are applicable to that specific leg of flight in that particular type or model of aircraft are available to be stored in and later recalled from the trip folder.

Figure 5:
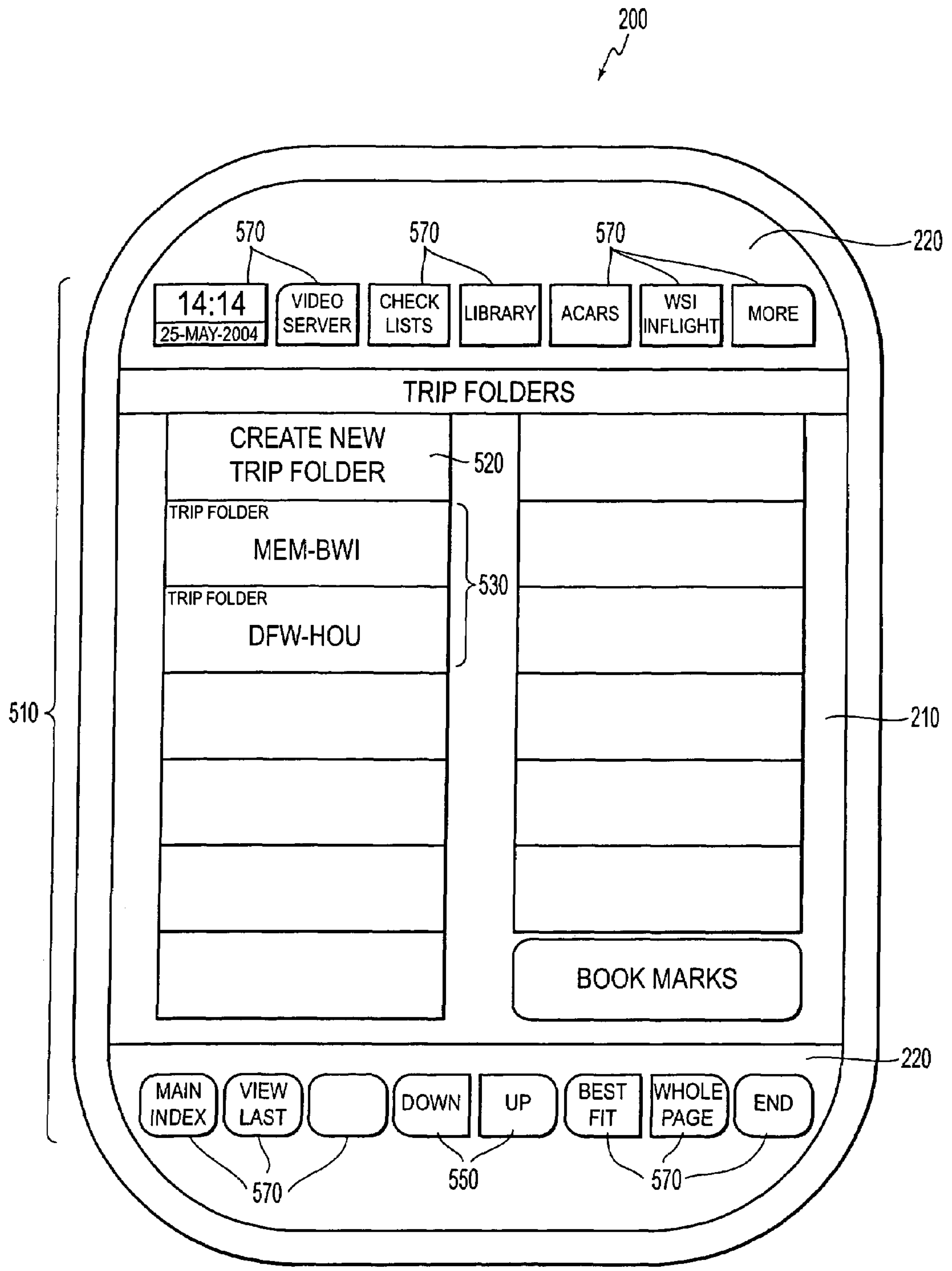
FIG. 5 illustrates a third operating view of the EFB of FIG. 2.

FIG. 5 illustrates a third operating view of the EFB 200 of FIG. 2. FIG. 5 shows a state in which an individual cockpit flight crew member or other EFB user has selected a subroutine by which he or she may create a new trip folder, and in response, an exemplary interactive display of a trip folder subroutine menu page 510 is presented to the user.

The trip folder subroutine menu page 510 includes, in an exemplary manner, an option 520 to create a new trip folder, as well as an index 530 of a plurality of previously created and stored trip folders for specific flight legs. As will be discussed further below, the individual trip folders stored for individual legs of flight are easily identified by designating the departure and destination airports by their unique three or four letter identifiers. As shown in exemplary manner in FIG. 5, the individual trip folders which have been previously stored represent flight legs from Memphis International Airport (MEM) to Baltimore Washington International Airport (BWI), and from Dallas Fort Worth International Airport (DFW) to Houston Airport (HOU). This index 530 may provide the individual cockpit flight member the ability later to recall the previously stored trip folder for a specific flight leg between the designated departure and destination airport. There is virtually no limit to the number of individual trip folders that can be created. Should the index exceed that which can be displayed, in exemplary manner, on a single page in the display area 210, multiple pages of the index of folders can be accessed through exemplary down and up scroll menu buttons 550, thus providing virtually unlimited access to the stored trip folders in the index.

Additionally, in the exemplary EFB 200 shown in FIG. 5, various other exemplary menu buttons 570 are shown. Such buttons are optionally provided to allow the user to further manipulate the display of individual data reference pages when displayed in the primary display area 210 of the exemplary EFB 200.

In various exemplary embodiments of the systems and methods according to this invention, when the create new trip folder button 520 is pressed, the trip folder creation subroutine is enabled.

Figure 6:
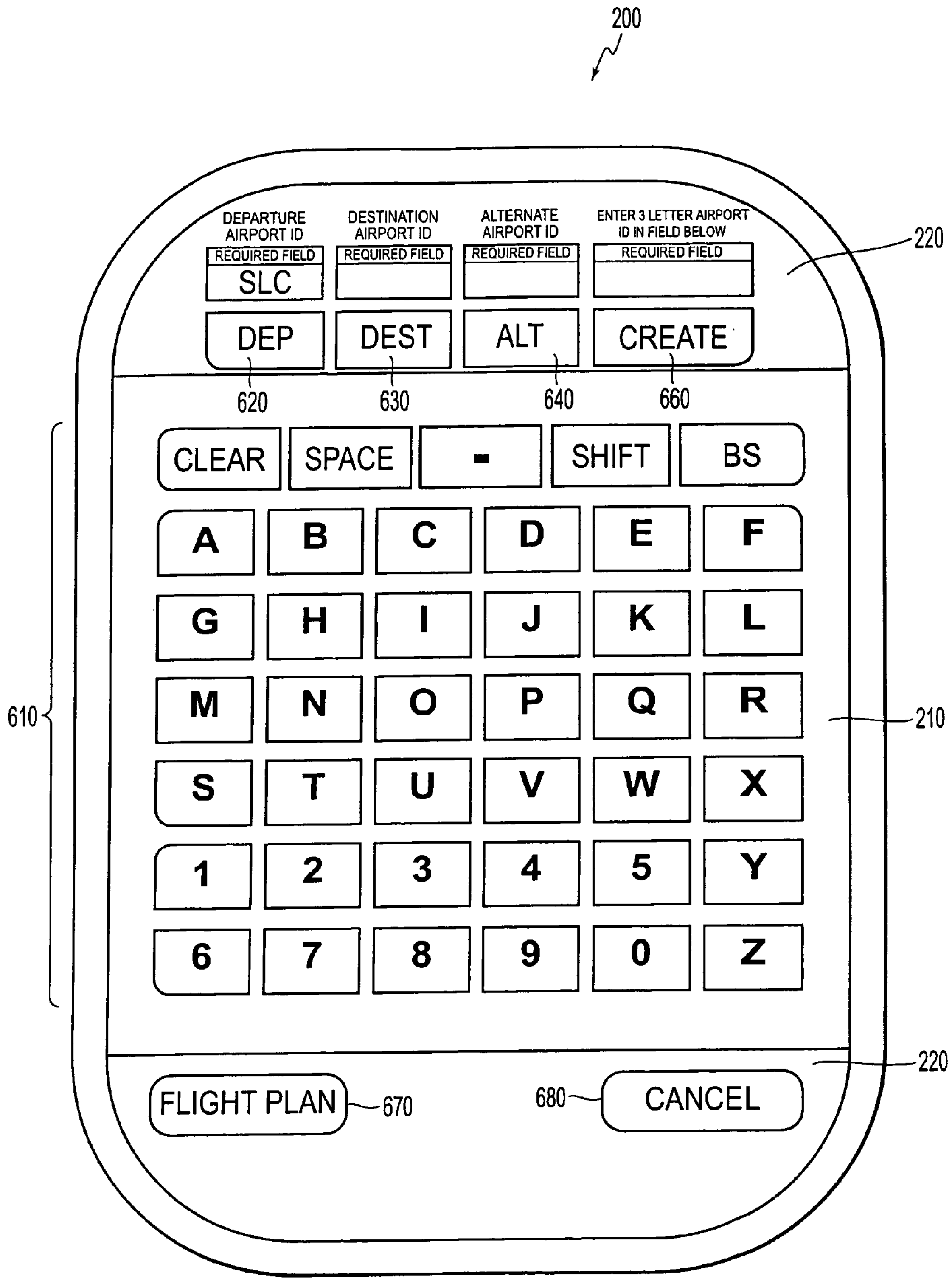
FIG. 6 illustrates a fourth operating view of the EFB of FIG. 2.

FIG. 6 illustrates a fourth operating view of the EFB 200 of FIG. 2. FIG. 6 shows a state in which the individual cockpit flight crew member or other EFB user has selected, from the screen shown in FIG. 5, the option to create a new folder, and the trip folder creation subroutine has been entered. In an exemplary manner, this subroutine navigates the individual cockpit flight crew member or other EFB user through a series of screens which provide for easy and quick selection of, for example, an appropriate unique identifier for the new folder.

In various exemplary embodiments of the systems and methods according to this invention, the overall display area of the EFB 200 becomes an interactive user interface by displaying, for example, a fully interactive alpha-numeric touch pad 610. Such alpha-numeric touch pad 610 is then available to, for example, provide the user a method for selection of a departure, a destination, and optionally an alternate airport ID by selecting the departure airport ID button 620, destination airport ID button 630, or optional alternate airport ID button 640, and then, for example, typing in the unique three or four letter airport identifier in a then-highlighted related data entry field. It should be appreciated that the exemplary EFB 200 is preferably "smart" enough to know whether an incorrect entry has been made, e.g., whether no such airport identifier exists in the overall index of information available in the data storage area of the exemplary EFB 200. As such, should the individual cockpit flight crew member make an incorrect entry in one of the airport ID data fields, the exemplary EFB may provide appropriate feedback to the user signaling that an incorrect entry has been made.

In an exemplary manner, once the departure and destination airport IDs have been entered to identify this specific trip folder, an exemplary create button 660 becomes active, providing the user the opportunity to create the content of the trip folder by selecting from among the potentially tens of thousands of data reference pages stored within the exemplary EFB 200. Once the user depresses the exemplary create button 660, the trip folder subroutine may create a trip folder uniquely identified, for example, by the concatenation of the airport IDs as entered, and may automatically retrieve from the data storage area the airport diagrams of the specified airports and place them in the newly created trip folder as theoretical starting and ending points in exemplary manner. The trip folder creation subroutine may then display the depiction of the departure airport in a full screen mode wherein the display covers the overall display area of the exemplary EFB 200. The user is then enabled to edit the trip folder by selecting in either of the upper and lower user data and system interface areas 220 from among additional editing functions which are provided to facilitate the trip folder creation subroutine.

In the exemplary EFB 200 shown in FIG. 6, a number of optional potential capabilities are displayed. The exemplary flight plan menu button 670 provides a capability whereby if a flight plan for a given leg of flight is available in an otherwise electronic and/or downloadable form, that information may be directly imported into the trip folder creation subroutine of the exemplary EFB 200 through manipulation of the flight plan menu button 670. Additionally, a cancel menu button 680 is provided to allow the user, for example, to either cancel a last data entry, or to cancel operation of the trip folder creation subroutine completely, returning the EFB to its document viewer mode of operation.

Figure 7:
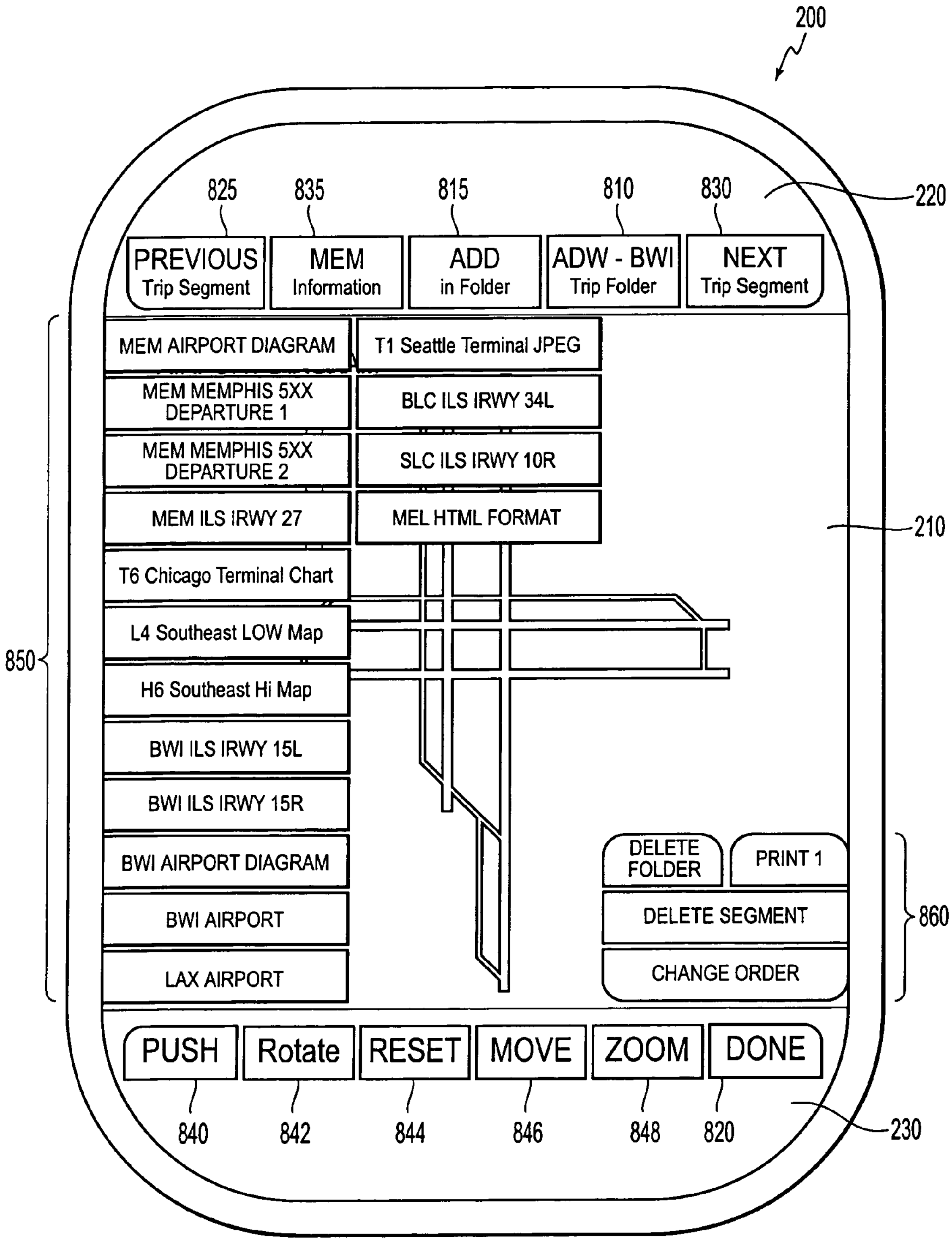
FIG. 7 illustrates a fifth operating view of the EFB of FIG. 2.

FIG. 7 illustrates a fifth operating view of the EFB 200 of FIG. 2. As shown in FIG. 7, a plurality of other options which may be associated with trip folder creation and use are displayed. A trip folder identification menu button 810 may indicate, in an exemplary manner, the trip folder in which the user is presently operating. The trip folder identification menu button 810 is alternatively available to list all items currently included in the selected trip folder as are shown by the multiple buttons 850 which are provided to show, in exemplary manner, the types of data reference pages which are available to be included in the exemplary trip folder. The exemplary "add" button 815 may allow a user to add a currently displayed data reference page to that trip folder. An exemplary "done" button 820 allows the user to close the current trip folder and exit the trip folder creation and/or execution subroutines and return the EFB to, for example, a simple document viewer mode of operation.

Exemplary "previous" and "next" buttons 825, 830 may provide the user the ability to return to a previous segment or data reference page display in the folder or alternatively to advance to a next segment or data reference page in the trip folder. Other buttons, such as, for example, the exemplary "information" button 835, are provided in order to perform functions such as, but not limited to, listing all items available which are related to the currently displayed data reference page, thereby allowing the user to go directly to related pieces of information on other data references pages. Other optional buttons as are shown located in the lower user data and system interface area 220 include a "PUSH" button" 840 which is associated with the flight crew coordination and interaction capability which is the subject of U.S. patent application Ser. No. 10/919,318. The rotate button 842, the reset button 844, the move button 846 and the zoom button 848 are all associated with a user's ability to manipulate, by touch, the displayed data reference page to his or her specific desire. The additional menu buttons displayed in an auxiliary user interface area 860 provide other necessary or desired capabilities for manipulating data associated with a specific trip folder.

It should be appreciated that while the processing described herein occurs primarily internal to the exemplary EFB 200 as a subroutine for selecting a subset of the available data reference pages tailored to an individual user's desires for immediate information exchange capability, optional provision for data processing could occur by uploading and downloading information through the automated input/output interface 150 depicted in FIG. 1.

Further, it should be appreciated that given the required inputs, the processing outlined in the systems and methods according to this invention can be implemented through software algorithms, hardware circuits, or any combination of software and hardware control elements present in the individual portable electronic data storage and display devices of which EFBs are an example.

Any data storage contemplated for the alterable exemplary embodiments described herein may be implemented using any appropriate combination of alterable, volatile or non-volatile memory, or non-alterable, or fixed memory. The alterable memory, whether volatile or non-volatile, can be implemented using any one or more of static or dynamic RAM, external disk drives with associated disk-type mediums, such as, for example, a writable or re-writable optical disk and disk drive, a hard drive, flash memory or any other like memory medium and/or device, internal to, or externally connected with, the exemplary individual portable electronic data storage and display device. Similarly, the non-alterable or fixed memory can be implemented using any one or more of ROM, PROM, EPROM, EEPROM, and optical ROM disk, such as a CD-ROM, or DVD-ROM disk which can be used with a compatible connected disk drive or any other like memory storage medium and/or device.

It should be further recognized that substantially all of the data reference pages stored in a portable electronic data storage and display device such as, for example, an EFB, will require routine update. Provision for such update exists in the currently available exemplary portable electronic data storage and display devices via the exemplary automated input/output interface 150 shown in FIG. 1. The trip folder subroutine merely selects from, and stores in a user prescribed order, links to the available required data reference pages. As such, there is no need to separately update the information contained in the trip folder as it is contemplated that only one copy of each data reference page will be maintained and updated in the data storage unit of the data storage and display device.

While this invention has been described in conjunction with the exemplary embodiments outlined above, these embodiments should be viewed as illustrative, and not limiting. Various modifications, substitutes or the like are possible within the spirit and scope of the invention.

What is claimed is:

1. A system for facilitating cockpit flight crew preflight planning for inflight execution of procedures, comprising:

a portable electronic data storage and display device which includes:

a data storage unit that stores a large number of data reference pages;

a data display unit that displays individual data reference pages;

a user interface; and a data processor that processes user inputs received through the user interface, wherein a plurality of data reference pages are selected and organized as a discrete set of data reference pages, and information regarding the plurality of data reference pages is stored under a unique file identifier in order that the discrete set of data reference pages can be later recalled and paged through in an expected order of need.

2. The system of claim 1, wherein the user interface is integral to the data display unit and allows for touch manipulation of the displayed data reference page so that when that data reference page is re-displayed later it will look the same as when it was last used.

3. The system of claim 2, wherein the user interface comprises an alpha-numeric touch pad.

4. The system of claim 1, wherein the user interface comprises a normally hidden portion of the data display unit, and is activated by initial user input of touching the data display unit.

5. The system of claim 1, wherein the user interface is usable to manipulate, in an interactive manner, a data reference page that is associated with an interactive subroutine.

6. The system of claim 1, wherein the discrete set of data reference pages comprises a trip folder representing a plurality of data reference pages which the user determines are desired for execution of a single leg of a flight.

7. The system of claim 6, wherein the trip folder is stored under the unique file identifier, the unique file identifier representing a concatenation of unique airport identifiers for a departure airport and a destination airport.

8. The system of claim 7, wherein a plurality of trip folders are stored and indexed for later recall.

9. The system of claim 1, further comprising a data input/output interface, wherein the data processor may automatically receive inputs to be processed through the data input/output interface.

10. The system of claim 1, further comprising a data transfer device that links at least two portable electronic data storage and display devices to facilitate communication between the at least two portable electronic data storage and display devices.

11. The system of claim 1, wherein the portable electronic data storage and display device is an Electronic Flight Bag.

12. The system of claim 1, wherein the plurality of data reference pages includes at least one of static text, still pictures, dynamic video, dynamic audio, interactive checklists and interactive forms as data reference pages stored in the data storage unit.

13. The system of claim 1, wherein the plurality of data reference pages includes at least one of information regarding a departure and a destination airport, departure procedures, enroute flight information, and approach procedures.

14. The system of claim 1, wherein the plurality of data reference pages includes at least one of a prestart, start, ground/takeoff, departure, in-flight, approach, landing and after landing/shutdown interactive checklist.

15. A method for facilitating cockpit flight crew preflight planning for inflight execution of procedures, comprising:

inputting via a user interface of a portable electronic data storage and display device a unique file identifier to identify information regarding a discrete set of data reference pages;

selecting a plurality of data reference pages from among those stored in the storage unit of the portable electronic data storage and display device that the user desires arranged in a specific order for later sequential recall;

ordering the selected plurality of data reference pages in a specific order related to an anticipated need scheme; and storing information regarding the selected and ordered plurality of data reference pages under the unique file identifier, the discrete set of data reference pages so ordered and stored to be available for later sequential recall as a trip folder.

16. The method of claim 15, further comprising:

displaying the data reference page on a display unit of the portable electronic data storage and display device; and manipulating a presentation of the data reference page to a user's individual desire such that when that data reference page is later re-displayed, the data reference page is displayed as the user desires.

17. The method of claim 15, wherein the discrete set of data reference pages comprises a trip folder representing a plurality of data reference pages which the user determines are desired for execution of a single leg of a flight.

18. The method of claim 15, wherein the unique file identifier represents a concatenation of unique airport identifiers for a departure airport and a destination airport.

19. The method of claim 15, wherein at least one of a first data reference page and a last data reference page in the discrete set of data reference pages is an airfield diagram for a departure or a destination airport.

20. The method of claim 15, wherein at least one of the data reference pages in the discrete set of data reference pages is an interactive data reference page allowing the user the to manipulate, in an interactive manner, the data reference page and an associated interactive subroutine by manipulating the displayed data reference page via the user interface.

21. The method of claim 15, further comprising automatically importing flight plan information from a separate source via an automated data/information interface.

22. The method of claim 15, wherein the plurality of data reference pages includes at least one of static text, still pictures, dynamic video, dynamic audio, interactive checklists and interactive forms as data reference pages stored in the data storage unit.

23. The method of claim 15, wherein the plurality of data reference pages includes at least one of information regarding a departure airport, a destination airport, an alternate airport, departure flight procedures, enroute flight procedures and approach flight procedures.

24. The method of claim 15, wherein the plurality of data reference pages includes at least one of prestart, start, ground/takeoff, departure, in-flight, approach, landing and after landing/shutdown interactive checklists.

25. The method of claim 15, wherein a plurality of trip folders are stored and indexed for later recall.

26. A storage medium on which is recorded a program for implementing the method of claim 15.

* * * * *